Aug. 20, 1963
S. L. RUBY ET AL
3,101,410
THERMIONIC RADIATION COUNTER
Filed Aug. 20, 1958
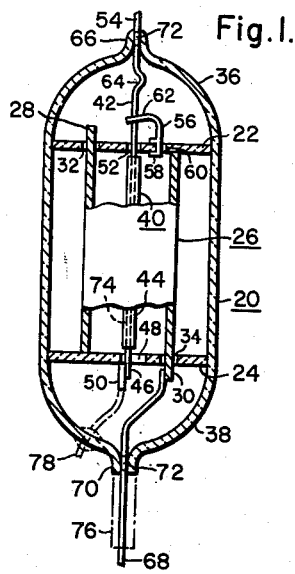
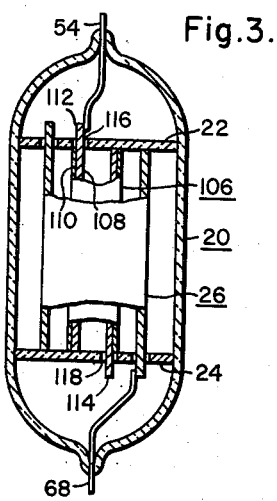
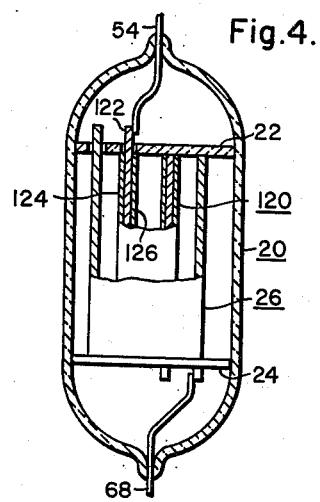
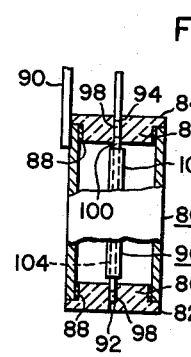
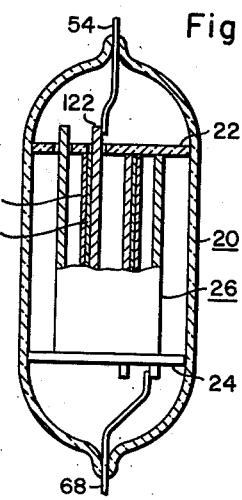
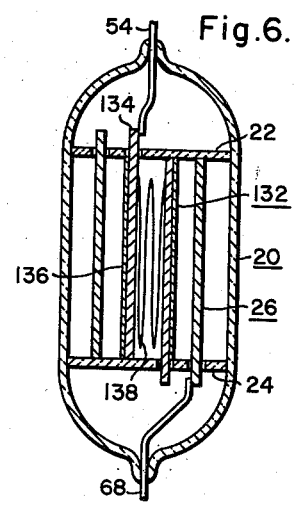
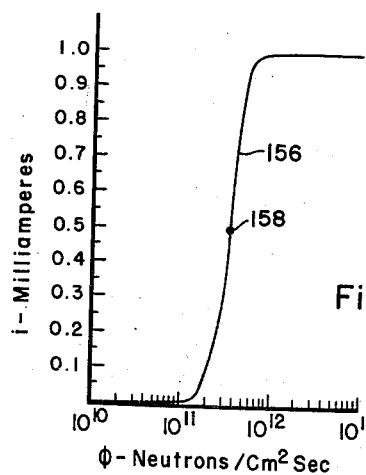
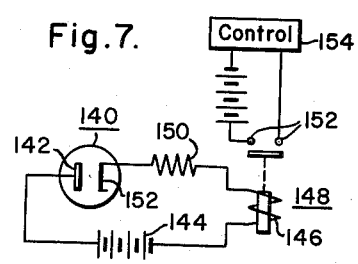
INVENTORS
Stanley L. Ruby,
Kuan Han Sun & Ted Fahrner.
BY
Donald D. Smith
ATTORNEY

United States Patent Office 3,101,410
Patented Aug. 20, 1963

3,101,410
THERMIONIC RADIATION COUNTER
Stanley L. Ruby, Glenshaw, Kuan-han Sun, Pittsburgh, and Ted Fahrner, Whitehall Borough, Pa., assignors to Westinghouse Electric Corporation, East Pittsburgh, Pa., a corporation of Pennsylvania
Filed Aug. 20, 1958, Ser. No. 756,238
18 Claims. (Cl. 250—83.1)

The present invention relates to electric discharge devices and, more particularly, relates to a thermionic detector for neutrons.

Neutrons are difficult to detect and measure, because they are subatomic particles possessing no electric charge. For this reason, a conventional ionization chamber, such as a Geiger-Mueller counter, cannot be used, for the neutrons passing through the counter do not ionize the gaseous filling contained therein. Accordingly, it is necessary to insert some material within the ionization chamber, which material is capable of reacting with the neutrons to produce either charged particles or emission of ultraviolet light. The ultraviolet light, then, is measured by conventional photoelectric devices. On the other hand, the charged particles when produced, ionize the gaseous filling contained within the ionization chamber. The neutronic detector of the invention, however, is made sensitive to thermal or fast neutrons depending upon the neutron-reactive materials employed wtihout the use of a gaseous filling. As a result the structure of the counter is simplified, and in those applications wherein size is important the dimension of the detector can be reduced considerably.

Known types of neutronic and other radiation counters frequently have outputs involving minute pulses or currents which must be amplified greatly before an adequate reading or measurement of the detector output can be made. Accordingly, these counters require the use of complicated external circuitry for their operation. In the case of conventional counters utilizing ionization chambers the electrodes thereof must be maintained at a considerable potential difference to ensure collection of the ions produced or resulting from the impinging radiation. The detector of the present invention, however, is arranged for operation at a relatively low potential.

Neutronic detectors frequently are employed adjacent a source of neutrons, which usually involves gamma and other background radiation. The neutronic detector, then, must be relatively insensitive to the background radiation in order to obtain an accurate reading of the neutronic flux. When employed in this manner, the detector may be exposed to elevated temperatures and to extremely dense neutronic flux. The detector contemplated by the invention is fabricated from materials having a relatively low neutronic capture cross section; as a result, the structural materials of the detector do not readily deteriorate in a high flux area, and moreover, their induced activity is negligible. The life of the detector is extended and its operations made more reliable. Thus, induced radioactivity in the detector of the invention does not interfere with handling thereof after the detector has been exposed to an environment of high neutron flux.

Desirably, then, a radiation detector should be capable of operating for extended periods without deterioration occasioned by an extremely hot and highly radioactive environment. In certain of these applications, it is essential that the detector be resistant to severe shock and vibrational forces, which resistance is ensured by the invention as a result of the simplicity and ruggedness of the detector structure.

Neutronic detectors employed adjacent a source of dense neutronic flux frequently are provided with external circuitry arranged to terminate, slow down, or otherwise control the neutronic source when the flux thereof reaches a predetermined density. In one arrangement of the invention, the neutronic detector operates as a switching means when the neutronic density reaches a predetermined level which is dependent upon the structure and materials comprising hte detector. The output of the detector can be employed for actuating suitable controlling means without the necessity of considerable external amplification and without the use of relatively large impressed potentials.

It is, accordingly, an object of the invention to provide a novel and efficient neutronic detector.

Another object of the invention is to provide an electric discharge device adapted particularly for detecting neutrons.

A further object of the invention is to provide an electric discharge device whose internal electric resistance decreases rapidly at a predetermined level of neutronic flux.

Still another object of the invention is to provide a novel neutronic detector capable of being manufactured in a small size and with a relatively few component parts.

Another object of the invention is the provision of a neutronic detector which is completely insensitive to gamma and other ionizing radiation associated with a source of neutrons.

A still further object of the invention is the provision of a neutronic counter capable of being operated for extended periods in a high temperature, high neutronic flux environment.

Another object of the invention is the provision of a novel switching arrangement capable of being actuated at a predetermined level of neutronic flux.

Still another object of the invention is a neutronic detector comprising an evacuated casing and capable of operation without the use of an ionization medium.

A still further object of the invention is the provision of a novel and efficient electronic discharge device, and more particularly one having means associated therewith and operable by impinging neutrons for heating the cathode of the device.

Additional objects, advantages and features of the invention, together with the foregoing objects, will be elaborated upon during the forthcoming description of illustrative modifications of the invention, with the description being taken in conjunction with the accompanying drawings, wherein:

FIGURE 1 is a longitudinal sectional view of one form of neutronic detector arranged in accordance with the invention;

FIG. 2 is a longitudinal sectional view of a modified form of the invention illustrated in FIG. 1;

FIG. 3 is a longitudinal sectional view of still another form of the neutronic detector arranged pursuant to the invention;

FIG. 4 is a longitudinal view, partially sectioned, of yet another disclosed arrangement of the neutronic detector;

FIG. 5 is a longitudinal sectional view of a modified form of the invention illustrated in FIG. 4;

FIG. 6 is a longitudinal view, partially sectioned, of still another form of the neutronic detector of the invention;

FIG. 7 is a schematic diagram of one form of neutron detecting controlling circuit arranged in accordance with the invention and;

FIG. 8 is a graph illustrating the operation of one form of neutronic detector of the invention.

Referring to FIG. 1 of the drawings, the exemplary form of the invention shown therein includes a ceramic or glass insulating housing 20 which is capable of being hermetically sealed. Positioned within the housing 20 are a pair of ceramic or mica insulator disks 22 and 24. A generally cylindrical anode 26 is disposed between the insulators 22 and 24 and positioned thereby by one or more tabs 28 and 30. The tabs 28 and 30 are inserted respectively through apertures 32 and 34 of the insulators 22 and 24 and are arranged to maintain the anode 26 concentrically of the housing 20. When thus assembled, longitudinal relative movement of the insulators 22 and 24 is prevented in one direction by the anode 26 inserted therebetween and in the other direction by the constricted end portions 36 and 38 of the housing 20. If desired the tabs 28 and 30 can be bent over to lend rigidity to the structure.

A filamentary-type thermionic cathode 40 is mounted in spaced relation within the anode 26. In this arrangement the cathode 40 includes a filament or wire 42 and a conventional electron emissive coating 44. The cathode 40 desirably is maintained concentrically of the anode 26 and at one end 46 thereof is secured to the insulator 24 by insertion through a V-shaped aperture 48. When thus inserted the end 46 is moved to the narrowest portion of the V-shaped aperture 48 where it is prevented from being pulled through the slot by means of a tab 50 of larger cross section than the filament 42, which tab is welded to the end 46 of the filament. The other end of the filament 42 is inserted freely through a central aperture 52 of the other insulator 32 and extends outwardly of the housing 20 to form an electric lead 54 for the cathode 40.

Desirably the cathode 40 is maintained under tension, throughout at least the length thereof which is disposed within the anode 26, to prevent sagging when the cathode is heated. This is accomplished in a conventional manner, by a leaf spring member 56 which is secured to the adjacent insulator 22 by means of its bracket 58, part of which is passed through aperture 60 of the insulator. The free end 62 of the spring member 56 is bent as shown in FIG. 1 and welded to the adjacent portion of the filament 42. A bend 64 is formed in the filament 42 between the spring member 62 and the point 66 whereat the filament is hermetically sealed to the housing 20. This bend 64 permits differential expansion of the various components of the detector without imparting undue stress to the filament. Electric contact is made to the anode 26 by another lead or conductor 68 which extends outwardly through the opposite constricted end 38 of the housing 20 and is hermetically sealed thereto as denoted by the reference character 70. The lead 68 is attached to the adjacent tab 30 of the anode 26 as by spot welding.

In the event that the housing 20 is fabricated from glass, the electrical leads 54 and 68 can be provided with relatively short lengths of copper 72 which, when free of contaminating surface oxides, can be hermetically sealed readily to the housing 20 at the pinched end portions 66 and 70 thereof. In order to minimize the induced activity of the housing, the latter may be fabricated from quartz or substantially pure silicon dioxide which does not readily absorb thermal neutrons. Silicon, of course, has a neutron capture cross section of 0.13 barn, while oxygen has a cross section of less than 0.0002. The housing 20 also can be fabricated from a ceramic material such as aluminum oxide, where induced activity desirably is minimized, inasmuch as aluminum has a cross section of 0.23. In the latter case, the sealing portion 72 of the leads 54 and 68 should be fabricated from Kovar which is an alloy of 29% Ni, 17% Co, .3% Mn, 53.7% Fe. The balance of the leads 54 and 68 can be fabricated form nickel, nickel plated steel or other corrosion-resistant material. In those applications where extremely high temperatures are not employed and where induced activity must be kept to a minimum for handling purposes, the leads 54 and 68 and other metallic portions of the neutronic detect, excepting the cathode 40, can be fabricated from aluminum. Where temperature resistance is important, as where the cathode 40 remains heated for extended periods of time or where the environment of the detector is at an elevated temperature, the anode 26 and other metallic components, excepting the cathode 40 the formation of which is described below, can be fabricated from a more temperature-resistant material such as nickel, nickel plated steel, blackened steel or aluminized steel. As is well-known, uncoated iron or steel components should not be employed within the housing 20 due to the tendency of the iron to poison the thermionic or electron-emissive coating 44. The insulators 22 and 24 desirably are fabricated from aluminum oxide or other ceramic material but may be fabricated from mica where low induced activity is not a prerequisite.

In accordance wtih the invention, the thermionic coating 44 is heated by a neutron-reactive material such as one of the fissionable isotopes $U^{235}$, $U^{233}$, $Pu^{239}$ or $Pu^{241}$, or an alpha-emitting isotope described hereinafter. In this example, the fissionable material of the arrangement in FIG. 1 is formed into a wire 74 forming part of the filament 42 and at least coextending with the thermionic coating 44. If uranium 238 is employed it desirably is enriched to upwards of 93% in the fissionable isotope $U^{235}$. When the neutronic detector is introduced into an area of substantial neutronic flux, the resulting fissioning of the atoms of the $U^{235}$ will furnish heat to the cathode coating 44 with the result that electrons will be emitted therefrom. The area within the housing 20 is evacuated to form a high vacuum so that the emitted electrons will flow substantially unimpeded to the anode 26.

As stated previously, the thermionic coating 44 is conventional in nature in this example and consists of oxides of barium, strontium and calcium. In an illustrative method for manufacturing the neutronic detector, the aforesaid oxides can be applied to the cathode 40, by electrophoretic deposition, for example, in the form of corresponding carbonates. A typical quantitative mixture of carbonates employed for this purpose consists of approximately 70% barium carbonate, 25% strontium carbonate and 5% calcium carbonate. Following assembly of the detector, one of the hermetic seals 66 is completed while the other end of the housing 20 is evacuated, for example, through exhaust tubulation denoted by the dashed outline 76. During the evacuation process the cathode 40 can be electrically heated to facilitate breaking down the carbonates to their corresponding electron-emissive oxides by connecting the cathode 40 to a suitable source of potential by means of its lead 54 and another lead 78 secured to the other end thereof and previously sealed in the adjacent wall portion of the housing 20.

In accordance with the present understanding of the invention, when the neutronic detector is subjected to a relatively dense neutronic flux, a number of the neutrons are captured by the fissionable isotope of the cathode 40. Through fissioning of the atoms thus affected, a power input per unit volume of the filament is created and its temperature begins to rise. Some heat will tend to flow longitudinally of the cathode 40 and be dissipated through its electric lead 54 and the leads 78, if employed. To minimize loss of heat in this fashion the leads 54 and 78 desirably are fabricated from small diameter wire; however, the major proportion of the heat will flow radiantly toward the relatively cooler anode 26. As the temperature of the cathode 40 continues to rise with increased neutronic flux, the cathode coating 44 is heated sufficiently to expel electrons into the space between the cathode 40 and the anode 26. The space charge created in this manner by the emitted electrons is diminished by a moderate potential applied to the anode 26, and hence, electrons flow from the cathode 40 to the anode 26. At a certain temperature of the cathode, more electrons are available than are flowing to the anode and the anode current saturates at a value determined by external circuitry. Before saturation occurs, however, the anode current is increasing very rapidly, and this increase with appropriate external circuitry as described hereinafter can be employed as a neutronic switch, as it were, for actuating suitable controlling means or the like associated, for example, with the aforementioned neutronic source.

Turning now to FIG. 2 of the drawing, the neutronic detector illustrated in FIG. 1 is modified to reduce still further the size and number of components thereof and to make the same more rugged for those applications wherein the detector is subjected to severe shock and vibrational forces. The physical size of the detector of FIG. 2 can be greatly reduced in the event that space is at a premium.

In the arrangement of FIG. 2, a tubular anode 80 is employed which together with a pair of ceramic end members 82 and 84 comprise a housing or casing for the neutronic detector. Each of the end members 82 and 84 has an inwardly extending reduced portion 86 which is inserted into the adjacent end of the anode casing 80. The anode 80 is hermetically sealed at its ends to the members 82 and 84, which are fabricated from an electrically insulating material, for example, fused aluminum oxide. To aid in hermetic sealing, a portion of the inner surface of the anode casing 80 at each end thereof is plated or otherwise coated with the aforesaid Kovar alloy which can be sealed readily to fused aluminum oxide as is well known. The Kovar coating is denoted by the reference numeral 88. The anode casing 80 can be fabricated from one of the materials mentioned previously, and electrical contact is made thereto by means of a conductor 90 spot welded to the outer surface of the anode casing.

The insulating end members 82 and 84 are furnished with a pair of aligned apertures 92 and 94, respectively, in which the ends of a central cathode 96 are inserted and then hermetically sealed. One end of the cathode 96 is extended through one of the end members, for example, the member 84 for purposes of making electrical contact with the cathode 96. To facilitate hermetically sealing the ends of the cathode 96 to the end members 82 and 84, respectively, short lengths 98 of Kovar are inserted in filamentary support 100 of the cathode 96. The cathode 96 is provided with a thermionic coating 102 extending substantially along the entire length of the anode casing 80 formed in the manner described above in connection with the coating 44 (FIG. 1). Also inserted in the filamentary support 100 is a length of wire 104 containing fissionable or alpha-emitting material and coextending substantially with the thermionic coating 102. The length of wire 104 is similar to the fissionable material denoted at 74 of FIG. 1, and hence will not be described further. The neutronic detector of FIG. 2 can be made as small as four millimeters in diameter and eight millimeters in length. Accordingly, employment of the detector is extended readily to those applications wherein space is at a very great premium, such as in the rather narrow coolant channels of certain neutron sources.

Referring now to FIG. 3 of the drawings in which similar reference characters refer to similar parts of FIG. 1, a modified form of the invention is shown therein. The latter form of the invention includes the housing 20, the anode 26, insulators 22 and 24, and the electrical leads 54 and 68 as in FIG. 1. For the filamentary-type cathode 40, however, a sleeve-type cathode 106 is substituted. The cathode 106 desirably is mounted in concentric relation within the anode 26 and comprises a sleeve 108 upon which a thermionic coating 110 is deposited. The sleeve 108 is mounted between the insulators 22 and 24 and is positioned thereon by its tabs 112 and 114. The tabs 112 and 114 are inserted, respectively, through apertures 116 and 118 of the insulators 22 and 24. To one of the tabs 112 the cathode lead 54 is attached as by spot welding. If desired, additional mounting tabs 112 or 114 can be utilized or alternatively the insulators 22 and 24 can be provided with central openings through which the entire end portions of the sleeve 108 are extended (not shown). It is contemplated, however, that with the arrangement shown, heat transfer from the sleeve 108 to the adjacent insulators 22 and 24 will be minimized.

In this arrangement of the invention the cathode sleeve 108 is fabricated from a substantial percentage of a fissionable or alpha emitting material noted heretofore and desirably comprises uranium enriched to greater than 93% of its isotope $U^{235}$. From the arrangement shown in FIG. 3, it will be obvious that considerably more fissionable isotope can be employed therein without encountering self-shielding than is the case of the filamentary cathodes of FIGS. 1 and 2. Accordingly, the latter described neutron detector with its directly heated sleeve-type cathode 106 is more sensitive to neutron flux, that is to say, to a neutron flux of lower density.

In the application of the fissionable material to the cathodes of the neutron counters illustrated in FIGS. 1 to 3, it is contemplated that the fissionable or alpha emitting material can be mixed intimately with the thermionic or electron-emissive cathode coatings 44, 102 or 110. When applied in this manner the oxide of one or more of the aforementioned fissionable materials desirably is employed. For example, in the case of uranium, the oxide ($UO_2$ or $U_3O_8$) can be mixed in pulverulent form with the powdered thermionic oxides or carbonates mentioned above. The $UO_2$ or $U_3O_8$ desirably is enriched to 90% or higher in the $U^{235}$ isotope, based on uranium content of the oxide, in order to minimize the amount of the uranium oxide component in the corresponding cathode coating and when mixed with one of the cathode coatings 44, 102 or 110 desirably comprises about 20% thereof. When the fissionable material is applied in this manner the cathode base, that is to say, the wires 74 and 104 and the cathode sleeve 108, are fabricated from normal cathode materials, for example, nickel or one of the well-known nickel alloys used for this purpose.

Referring now to FIG. 4 of the drawings, the exemplary form of the invention illustrated therein likewise employs some of the components described in connection with FIGS. 1 and 3 where shown by identical reference characters. Thus, the neutronic detector of FIG. 4 includes the housing 20, the anode 26, insulators 22 and 24 and associated components, all of which have been described previously. As in the case of FIG. 3, the latter neutronic detector comprises a sleeve-type cathode 120 similarly mounted concentrically of the anode 26 between the insulators 22 and 24. Upon the outer surface of sleeve 122 a thermionic cathode coating 124 is deposited. The cathode sleeve 122 desirably is composed of nickel or a cathode alloy alluded to above upon the entire surface of the cathode sleeve 122. The neutron-reactive material 126 in this example is plated in metallic form or applied electrophoretically as an oxide coating to the inner surface of the sleeve 122. It is contemplated also that the neutron-reactive material 126 can be applied internally of the sleeve 122 in the form of a closely fitting relatively thin cylinder. When the material 126 is applied internally of the cylinder 122 in the form of either a coating or plating of the aforementioned cylinder, it is contemplated that the wall of the cathode sleeve 122 be made as thin as practical in order to facilitate heat transfer from the neutron-reactive material to the externally applied electron-emissive coating 124. Desirably the coating 126 comprises uranium enriched as aforesaid and alternatively $UO_2$ or $U_3O_8$ likewise enriched as noted above.

It is also contemplated that the neutron-reactive material, as better shown in FIG. 5 of the drawings, can be applied to the external surface of the cathode sleeve 122 as shown by the coating 128. A layer or coating 130 of electron-emissive oxides is then applied to the outer surface of the fissionable coating 128.

In the neutronic detector, as illustrated in FIG. 6 of the drawings, which likewise employs several of the components mentioned previously, the detector comprises the housing 20, the anode 26, and associated components. A sleeve-type cathode 132 is suspended between the insulators 22 and 24 in concentric relation with the anode 26. Cathode 132 is supported inwardly of the anode 26 and comprises a supporting sleeve 134 upon the outer surface of which a thermionic coating 136 is deposited. The coating 136 is substantially coextensive with the length of the anode 26. The sleeve 134 in this example is fabricated from nickel or a cathode nickel alloy while the coating 136 comprises the electron-emissive oxides mentioned previously.

The emissive coating 136 is indirectly heated by a folded wire 138 serving as a "heater" for the cathode sleeve 134. The heater wire 138 is fabricated from one of the aforementioned neutron-reactive materials and desirably from uranium enriched as aforesaid. Although the fissionable material can be inserted within the sleeve 134 in the form of a rod or a plurality of rods, a folded wire is desirable in order to minimize self-shielding in the fissionable material. This follows from the fact that the wire heater 138 is of relatively small diameter.

In fabricating the various forms of the neutron counters disclosed herein it is contemplated that a material which yields alpha particles upon absorbing thermal neutrons can be substituted for the fissionable material comprising the heat source of the neutron detector. For example, the filamentary cathode support 74 or 100 (FIG. 1 or 2), the cathode sleeve 108 (FIG. 3), and the coating 128 (FIG. 5) can be fabricated from boron enriched with a substantial percentage of its isotope $B^{10}$, for example, in the neighborhood of 90%. The isotope $B^{10}$ reacts with impinging thermal neutrons to produce short-range alpha particles which in turn generate heat in the adjacent electron-emissive coating. In the remaining forms of the neutron counter, the coating or cylinder 126 (FIG. 4) or the folded heater wire 138 (FIG. 6) can be fabricated from lithium, similarly enriched in its $Li^6$ isotope, which emits a relatively longer range alpha particle upon absorption of thermal neutrons. It is apparent, then, that a short-range alpha emitter such as $boron^{10}$ can be mixed directly in pulverulent form with the electron-emissive coatings 44, 102 or 110 in the forms of the invention illustrated in FIGS. 1 to 3, respectively. In the latter form of the invention the boron desirably is added in the form of its oxide $B_2O_3$ in which the boron is enriched as aforesaid and which comprises approximately 25% of the electron-emissive coating.

When the neutron-reactive material, that is to say, the fissionable isotope or the alpha emitter, is mixed directly with the cathode coating, the oxide form of the alpha emitter or of the fissionable material is desirable, as aforesaid. These oxides usually can withstand elevated temperatures without vaporizing and contaminating adjacent particles of the electron-emissive oxides. Moreover, the neutron-reactive oxides themselves are limited electron emitters at the operating temperatures of the cathode.

Referring now to FIG. 7 of the drawings, an illustrative form of neutron switch or controlling circuit is shown schematically therein. The circuit is designed to operate, in this example, with a neutronic detector 140 having the dimensions and compositions such as those described previously in connection with FIG. 2 of the drawings. The anode 142 of the detector is connected to the positive terminal of a preferably unidirectional source 144 of electric potential; the negative terminal of the source 144 is coupled through coil 146 of a relay 148 and through a cathode or loading resistance 150 to the cathode 152 of the detector. When the detector 140 saturates at a predetermined neutron flux sufficient current flows through the circuit of FIG. 7 to operate the relay 148. Contacts 152 are then closed to energize associated circuitry designated by the reference numeral 154 and labeled control in FIG. 7 of the drawings. The circuitry 154 can be employed to control the source of neutrons measured by the detector 140, for actuating an alarm, or the like. When the predetermined neutron flux is selected at $5 \times 10^{11}$ neutrons per cm.$^2$-sec., for example, a source 144 having a potential of 10 volts and a load resistance 150 of 10,000 ohms are utilized. Under these conditions when the detector 140 begins to saturate an output current of approximately 0.5 milliampere is obtained which is sufficient to energize the relay 148 without the use of the amplifying circuitry usually required for conventional radiation detectors.

Referring now to FIG. 8 of the drawings the operation of the neutronic detector particularly that illustrated in FIG. 2 is shown graphically. The single curve 156 represents the output current of the detector 140 when employed with the circuit parameters mentioned in connection with FIG. 7. The curve 156, then, represents current in milliamperes as plotted against neutronic flux in neutrons per cm.$^2$-sec. The relay 148 in this example is set to operate when the detector current reaches the point designated by the reference numeral 158.

To obtain the operating characteristic of FIG. 8, the filamentary support 104 of FIG. 2 is furnished in a diameter of less than 1.0 mm. and desirably 0.4 mm. and is fabricated from uranium with an enrichment in $U^{235}$ upwards of 93%. This quantity of $U^{235}$ when subjected to a flux of about $5 \times 10^{11}$ thermal neutrons per cm.$^2$-sec., is sufficient to release through its fissioning atoms approximately 2 watts per cm.$^2$ in the cathode 152 (FIG. 7). This power is sufficient to raise the temperature of the cathode to a point where a significant thermionic emission is attained. As stated previously, a lesser percentage enrichment can be utilized, but in this case the enrichment is desirably as high as possible to minimize the overall size of the detector 140.

The detector can be made to saturate at higher fluxes either by decreasing the percentage enrichment of $U^{235}$, by decreasing the potential of the source 144, or by increasing the load resistance 150. For example, with the circuit of FIG. 7 the detector 140 can be made to saturate at $5 \times 10^{14}$ neutrons per cm.$^2$-sec. by employing an enrichment of 9%.

In the circuit arrangement of FIG. 7 and with reference to the graph of FIG. 8, it is shown that the resistance of the detector is very high for a thermal neutron flux below $10^{11}$ neutrons per cm.$^2$-sec. but becomes almost zero as the flux exceeds $5 \times 10^{11}$ neutrons per cm.$^2$-sec. Since the resistance goes from very high to very low, this is equivalent to closing a switch and thus the circuit arrangement of FIG. 7 is useful for control purposes as described previously.

It has been found that the aforementioned switching response is quite rapid. In response to a sudden change in neutron flux where the density changes from a point below $10^{11}$ to approximately $10^{14}$ neutrons per cm.$^2$-sec., the temperature begins to rise at about $4 \times 10^{4}$° C. per sec. Thus, changes of about 100° C., which are enough to saturate the detector, can occur within a few milliseconds. Smaller flux rises, of course, produce a slower response.

The heating effects of the neutron-reactive material employed in the neutronic detector, for example, that illustrated in FIGS. 2 and 7 can be shown from the following calculations:

The number of fissions per sec. per cu. cm. in the filament, assuming the filament is small enough to avoid self-shielding and is composed of substantially 100% of fissionable material, is given by the following relationship:

$$N = \frac{1.89 \rho \sigma \phi}{\pi A} \text{ fissions/cm.}^3 \text{ sec.} \quad (1)$$

where:

$N$ = the number of fissions
$\rho$ = density of the fissionable material
$\sigma$ = the fission cross section in barns
$\phi$ = the neutronic flux in neutrons/cm.²-sec.
$A$ = the mass of the fissionable material Neglecting heat conductivity longitudinally of the filament 96 and assuming that each atomic fission contributes 200 mev. or $0.3 \times 10^{-10}$ watt-sec. to the filament, the heat flow through the surface of the filament 104 to the thermionic coating 102 is calculated as follows:

$$H = \frac{r\rho\sigma\phi}{A} \times 10^{-11} \text{ watt/cm.}^2 \qquad (2)$$

where:

$H$ = heat flow in watts/cm.²
$r$ = the radius of the filament 104 in cm.

Since the filament or cathode 96 is hot compared to its surroundings at its operating temperature, the heat flow through its surface may also be related to its temperature as follows:

$$H = \theta T^4 = \frac{r\rho\sigma\phi}{A} \times 10^{-11} \text{ watt/cm.}^2 \qquad (3)$$

where:

$T$ = the temperature of the filament in ° K.
$\theta$ = constant = $5.7 \times 10^{-12}$ watt/cm.² ° K.⁴

The indicated value of $\theta$ refers to "black body" emission; however, for the usual thermionic oxide coated cathode, $\theta$ is nearly correct. Equation 3 reduces to:

$$T = 1.15 \left( \frac{r\rho\sigma\phi}{A} \right)^{1/4} \text{ ° } K \qquad (4)$$

Richardson's equation for thermionic emission is now used to estimate the electron currents available and is usually written as follows:

$$i = AT^2 e^{-W/kT} \text{ amp./cm.}^2 \qquad (5)$$

where:

$i$ = emitted current in amperes/cm.²
$A$ = constant = 120 amp./cm²
$W$ = the work function in electron volts and for oxide coated cathodes a value of W of 2 volts is approximately correct.

By substituting the expression for T in Equation 4 into Equation 5, the following relationship is obtained:

$$i = 159 \frac{r\rho\sigma\phi}{A} \exp \left[ -\frac{W}{9.6 \times 10^{-5} \left( \frac{r\rho\sigma\phi}{A} \right)^{1/4}} \right] \qquad (6)$$

Solutions of Equation 6 for various neutronic flux densities are shown in the following table:

| $\phi$ (r/cm²-sec.) | $i$ (amperes/cm²) |
|---|---|
| $1 \times 10^8$ | $1.1 \times 10^{-28}$ |
| $3 \times 10^8$ | $1.9 \times 10^{-19}$ |
| $1 \times 10^9$ | $1.4 \times 10^{-12}$ |
| $3 \times 10^9$ | $0.9 \times 10^{-7}$ |
| $1 \times 10^{10}$ | $6.0 \times 10^{-4}$ |
| $3 \times 10^{10}$ | 1.0 |
| $1 \times 10^{11}$ | 274 |

From the results tabulated above, it is seen that for $\phi = 3 \times 10^9$, $i = 10^{-7}$ while for $\phi = 10^{10}$, $i$ increases about 6000 times. In practice the rise in current with increase in flux is not as steep as that indicated above, and the behavior approximates that of ordinary thermionic cathodes for which a rise in input power of a factor of two increases the cathode current by a factor of ten.

The relationship embodied in Equation 5 indicates that cathode temperature increases of about 100° C. double the current. An estimate of the time required for the temperature to increase by 100° C. when the neutronic flux is suddenly increased is, therefore, pertinent. A relatively simple differential equation is involved when the change in flux is less than that required to increase the filament temperature by about 10% or, in other words, when the temperature rise of 100° C. is in the operating temperature region of the filamentary cathode. The time required for the cathode temperature to change within 1/e of the new or final temperature is given by:

$$t_p = \frac{rC_v}{8\theta T_0^3} \qquad (7)$$

where:

$T_0$ = initial temperature of filament in K°
$t_p$ = the thermal relaxation time
$C_v$ = the specific heat of the filament in the case of substantially pure $U^{235}$ and where the cathode has an initial temperature of 1270° K. and the $U^{235}$ forms substantially all of the filamentary support 104 or 74 having a diameter of 0.04 cm. This relaxation time is 60 milliseconds.

Consequently, the time required to double the current is approximately:

$$\text{Time to double current} = \frac{100° \text{ C.}}{dT/dt} = \frac{100°\text{C.}}{\Delta T/0.06} \qquad (8)$$

where: $\Delta T$ = change in temperature of the filament, and T is given by the relationship:

$$\Delta T = 2.25 \times 10^{-12} \frac{r\rho\sigma\phi}{8\theta T_0^3} \text{ ° } K \qquad (9)$$

where the terms are as defined previously.

Solving Equations 8 and 9 and assuming that the neutronic flux has jumped to $2.5 \times 10^{12}$ from a previous level of less than $10^{11}$, it is found that in 6 milliseconds the cathode current will increase beyond the .5 milliampere necessary to operate the relay 148 of FIG. 7. In making the foregoing calculations, it is assumed that the Childs-Langmuir relation for current flow from a space charge limited cathode ($i = kV^{3/2}$) is applicable.

From the foregoing discussion, it will be obvious that novel and efficient forms of an electronic discharge device adapted for detecting neutrons have been disclosed herein. It is to be understood that the descriptive material employed herein is intended to exemplify the invention and is not to be interpreted as limitative thereof. For example, it is contemplated that a bank of neutron detectors described herein, each having a different percentage enrichment of their fissionable or alpha emitting material, can be employed to meter neutronic density quantitatively by giving a successive indication of incremental changes in neutronic flux. Numerous embodiments of the invention, therefore, will occur to those skilled in the art without departing from the spirit and scope of the invention.

Accordingly, what is claimed as new is:

1. A radiation detector comprising a hollow housing, a pair of spaced confronting electrodes mounted within said housing, one of said electrodes being an anode mounted adjacent said housing and the other of said electrodes being a cathode mounted adjacent said anode, said cathode comprising a thermally responsive electron-emissive portion, and a quantity of neutron-reactive material disposed adjacent said portion and thermally coupled thereto, said material being capable of producing heat in said portion upon impingement of external neutrons.

2. A radiation detector comprising a hollow housing, a pair of spaced confronting electrodes mounted within said housing, one of said electrodes being an anode and the other of said electrodes being a cathode juxtaposed to said anode, said cathode comprising a thermally responsive electron-emissive portion, and a quantity of neutron-reactive material supported adjacent said portion in heat exchange relationship therewith, said material being capable of producing heat in said portion upon impingement of external neutrons in the thermal velocity range thereof.

3. A radiation detector comprising an evacuated housing, a pair of spaced confronting electrodes mounted within said housing, one of said electrodes being an anode mounted adjacent said housing and the other of said electrodes being a cathode mounted adjacent said anode, said cathode comprising an elongated filament supported concentrically of said anode, said filament having a portion of thermally responsive electron-emissive material substantially coextending with said anode, said filament including a quantity of a neutron-reactive material capable of producing heat upon impingement of external neutrons and thermally coupled to said electron-emissive portion.

4. A radiation detector comprising a hollow housing, an anode and a cathode spacedly disposed within said housing, said cathode comprising an elongated filament supported concentrically of said anode, said filament having a coating of thermally responsive electron-emissive material deposited thereon and substantially coextending with said anode, and a neutron-reactive material capable of producing heat upon impingement of external neutrons admixed with said coating, whereby said electron-emissive material is thermally coupled to said neutron-reactive material.

5. A radiation detector comprising an enclosed housing, a spaced anode and cathode, said anode forming part of said housing, the remainder of said housing including spaced insulating portions, said cathode being mounted within said housing and secured to said insulating portions, said cathode comprising a filamentary support, a thermally responsive electron-emissive coating deposited on said support and juxtaposed to said anode, and a neutron-reactive material capable of producing heat upon impingement of external neutrons thermally coupled to said coating.

6. A radiation detector comprising an enclosed housing, an anode and a cathode spacedly mounted within said housing, said cathode comprising a tubular supporting sleeve, and a thermally responsive electron-emissive coating deposited upon the outer surface of said sleeve and juxtaposed to said anode, said sleeve being fabricated from a neutron-reactive material capble of producing heat upon impingement of external neutrons and disposed in heat exchange relationship with said coating.

7. A radiation detector comprising a hollow housing, a pair of spaced electrodes mounted within said housing, said electrodes including an anode mounted adjacent said housing, and a cathode mounted adjacent said anode, said cathode comprising a tubular supporting sleeve, a thermally responsive electron-emissive coating deposited upon the outer surface of said sleeve and juxtaposed to said anode, and a quantity of neutron-reactive material capable of producing heat upon impingement of external neutrons thermally coupled to said emissive coating.

8. A radiation detector comprising a hollow housing, a pair of spaced electrodes disposed within said housing, said electrodes including an anode mounted adjacent said housing, and a cathode mounted adjacent said anode, said cathode comprising a tubular supporting sleeve, a thermally responsive electron-emissive coating deposited upon the outer surface of said sleeve and juxtaposed to said anode, and a closely fitting tubular member inserted within said sleeve, said tubular member including a neutron-reactive material capable of producing heat upon impingement of external neutrons and thermally coupled to said coating.

9. A radiation detector comprising a hollow housing, a pair of spaced electrodes disposed within said housing, said electrodes including an anode mounted adjacent said housing, and a cathode mounted adjacent said anode, said cathode comprising a tubular supporting sleeve, a thermally responsive electron-emissive coating deposited upon the outer surface of said sleeve and juxtaposed to said anode, a multifolded wire inserted within said sleeve and thermally coupled to said coating, said wire being fabricated from a neutron-reactive material capable of producing heat upon impingement of external neutrons.

10. A radiation detector comprising a hollow housing, a pair of spaced confronting electrodes disposed within said housing, one of said electrodes being a tubular anode mounted adjacent said housing and the other of said electrodes being a cathode mounted adjacent said anode, said cathode comprising a thermally responsive electron-emissive section, a quantity of neutron-reactive material supported adjacent said section and thermally coupled thereto, said material being capable of producing heat in said section upon impingement of neutrons, said material including at least one isotope which is fissionable upon absorption of external neutrons.

11. A radiation detector comprising a hollow housing, a pair of spaced confronting electrodes disposed within said housing, one of said electrodes being a tubular anode mounted adjacent said housing and the other of said electrodes being a cathode mounted adjacent said anode, said cathode comprising a thermally responsive electron-emissive section, a quantity of neutron-reactive material supported adjacent said section in heat exchange relationship therewith, said material being capable of producing heat in said section upon impingement of external neutrons, said material including an isotope which emits alpha particles upon absorption of neutrons.

12. A radiation detector including a hollow housing, a pair of spaced electrodes disposed within said housing, one of said electrodes being an anode mounted adjacent said housing, the other of said electrodes being a cathode mounted adjacent said anode, said cathode comprising a support, a thermally responsive electron-emissive coating deposited on said support, said coating including a proportion of an oxide capable of producing heat upon impingement of external neutrons.

13. A radiation detector including a hollow housing, a pair of spaced electrodes disposed within said housing, one of said electrodes being an anode mounted adjacent said housing, the other of said electrodes being a cathode mounted adjacent said anode, said cathode comprising a support, a thermally responsive electron-emissive coating deposited on said support, said cathode in addition comprising a quantity of uranium having a substantial enrichment in the $U^{235}$ isotope and thermally coupled to said coating.

14. A radiation detector including a hollow housing, a pair of spaced electrodes disposed within said housing, one of said electrodes being an anode mounted adjacent said housing, the other of said electrodes being a cathode mounted adjacent said anode, said cathode comprising a support, a thermally responsive electron-emissive coating deposited on said support, said cathode in addition comprising a quantity of uranium having an enrichment in excess of 90% of $U^{235}$ and thermally coupled to said coating.

15. A radiation detector including a hollow housing, a pair of spaced electrodes disposed within said housing, one of said electrodes being an anode mounted adjacent said housing, the other of said electrodes being a cathode mounted adjacent said anode, said cathode comprising a support, a thermally responsive electron-emissive coating deposited on said support, said cathode in addition comprising a quantity of boron having a substantial enrichment in the $B^{10}$ isotope and thermally coupled to said coating.

16. A radiation detector including a hollow housing, a pair of spaced electrodes disposed within said housing, one of said electrodes being an anode mounted adjacent said housing, the other of said electrodes being a cathode mounted adjacent said anode, said cathode comprising a support, a thermally responsive electron-emissive coating deposited on said support, said cathode including a quantity of boron enriched in excess of 90% of the $B^{10}$ isotope and thermally coupled to said coating.

17. A radiation detector comprising a hollow housing, a pair of spaced electrodes disposed within said housing, said electrodes including an anode mounted adjacent said housing, and a cathode mounted adjacent said anode, said cathode comprising a tubular supporting sleeve, a thermally responsive electron-emissive coating deposited upon the outer surface of said sleeve and juxtaposed to said anode, and a multifolded wire inserted within said sleeve and thermally coupled to said coating, said wire being fabricated from a neutron-reactive material capable of producing heat upon impingement of external neutrons and having a diameter of less than one millimeter to avoid self-shielding in said neutron-reactive material.

18. A radiation detector comprising an enclosed housing having an anode and a thermionic cathode spacedly juxtaposed therewithin, a radiation-responsive material thermally coupled to said cathode which causes said cathode to be heated and thermionically to emit electrons upon impingement of said material with external radiation, and indicating means coupled to said anode and said cathode.

References Cited in the file of this patent

UNITED STATES PATENTS

| | | |
|---|---|---|
| 2,012,237 | Beck | Aug. 20, 1935 |
| 2,588,789 | Zinn | Mar. 11, 1952 |
| 2,599,156 | Bousman | June 3, 1952 |
| 2,666,157 | Gleason | Jan. 12, 1954 |
| 2,672,567 | Alvarez | Mar. 16, 1954 |
| 2,811,649 | Atkins et al. | Oct. 29, 1957 |
| 2,824,971 | Weeks | Feb. 25, 1958 |
| 2,845,560 | Curtis et al. | July 29, 1958 |
| 2,867,727 | Welker | Jan. 6, 1959 |
| 2,874,304 | Lichtenstein | Feb. 17, 1959 |